US011868152B2

(12) United States Patent
Lee et al.

(10) Patent No.: US 11,868,152 B2
(45) Date of Patent: Jan. 9, 2024

(54) BANDGAP REFERENCE CIRCUIT AND ELECTRONIC DEVICE INCLUDING THE SAME

(71) Applicant: Samsung Electronics Co., Ltd., Suwon-si (KR)

(72) Inventors: Hajun Lee, Suwon-si (KR); Jaewook Kwon, Suwon-si (KR); Hyeongtae Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/970,026

(22) Filed: Oct. 20, 2022

(65) Prior Publication Data

US 2023/0367350 A1 Nov. 16, 2023

(30) Foreign Application Priority Data

May 13, 2022 (KR) ........................ 10-2022-0059046

(51) Int. Cl.
*G05F 3/30* (2006.01)
*G05F 3/22* (2006.01)

(52) U.S. Cl.
CPC ................ *G05F 3/225* (2013.01); *G05F 3/30* (2013.01)

(58) Field of Classification Search
None
See application file for complete search history.

(56) References Cited

U.S. PATENT DOCUMENTS

| | | | | |
|---|---|---|---|---|
| 6,255,807 | B1 | 7/2001 | Doorenbos et al. | |
| 7,636,010 | B2 | 12/2009 | Huang | |
| 7,705,662 | B2 | 4/2010 | Ng et al. | |
| 7,750,728 | B2 | 7/2010 | Marinca | |
| 7,834,610 | B2 | 11/2010 | Peng et al. | |
| 8,648,648 | B2 * | 2/2014 | Choi | G05F 3/30 327/539 |
| 8,710,901 | B2 | 4/2014 | Bibee | |
| 9,016,939 | B2 | 4/2015 | Chang et al. | |
| 10,289,145 | B2 | 5/2019 | Sano et al. | |
| 10,411,597 | B1 | 9/2019 | Far | |
| 10,671,109 | B2 * | 6/2020 | Ibrahim | H03F 3/45273 |
| 11,199,865 | B2 * | 12/2021 | Kang | G05F 3/245 |
| 11,243,120 | B2 | 2/2022 | Cho et al. | |
| 2016/0266598 | A1 | 9/2016 | Wong et al. | |

OTHER PUBLICATIONS

P. Malcovati et al., "Curvature-Compensated BiCMOS Bandgap with 1-V Supply Voltage," IEEE Journal of Solid-State Circuits, vol. 36, No. 7, Jul. 2001.

* cited by examiner

*Primary Examiner* — Jeffery S Zweizig
(74) *Attorney, Agent, or Firm* — Harness, Dickey & Pierce, P.L.C.

(57) ABSTRACT

A bandgap reference circuit generates a PTAT voltage and a CTAT voltage having a different temperature characteristic from the PTAT voltage and generates a reference voltage based on the PTAT voltage, the CTAT voltage, and a compensation voltage. The bandgap reference circuit generates a CTAT current having a different temperature characteristic from the PTAT voltage based on the CTAT voltage and determines the compensation voltage based on the CTAT current.

20 Claims, 16 Drawing Sheets

200

700

1100

1300

1400

BANDGAP REFERENCE CIRCUIT AND ELECTRONIC DEVICE INCLUDING THE SAME

CROSS-REFERENCE TO RELATED APPLICATION

This application claims priority to and the benefit of Korean Patent Application No. 10-2022-0059046 filed in the Korean Intellectual Property Office on May 13, 2022, the entire contents of which are incorporated herein by reference.

BACKGROUND

Field

The disclosure relates to a bandgap reference circuit and an electronic device including the same.

Description of the Related Art

A semiconductor device may include various circuits for generating, processing, and/or storing data. The circuits of the semiconductor device may operate based on a reference voltage supplied from, e.g., an external power source and/or other source (or circuit). However, the reference voltage may vary depending on external factors such as a temperature. In order to prevent malfunction of the circuits of the semiconductor device and ensure reliability, there is a need for a bandgap reference circuit that stably outputs a constant level voltage even when there are changes in the external factors (e.g., temperature).

SUMMARY

Some embodiments may provide a bandgap reference circuit and an electronic device including the same, for stably outputting a reference voltage with a constant level even when there are changes in a temperature.

According to some embodiments, a bandgap reference circuit including a reference voltage generating circuit and a compensation circuit may be provided. The reference voltage generating circuit may generate a proportional to absolute temperature (PTAT) voltage and a complementary to absolute temperature (CTAT) voltage having a different temperature characteristic from the PTAT voltage and may generate a reference voltage at an output node based on the PTAT voltage, the CTAT voltage, and a compensation voltage. The compensation circuit may generate a CTAT current, having a different temperature characteristic from the PTAT voltage based on the CTAT voltage, and determine the compensation voltage based on the CTAT current.

In some embodiments, the reference voltage generating circuit may include a first resistor and may determine the PTAT voltage based on the first resistor and a PTAT current. The compensation circuit may include a second resistor and may determine the CTAT current based on the second resistor.

In some embodiments, the compensation circuit may further include a first non-linear compensation circuit and a second non-linear compensation circuit. The first non-linear compensation circuit may include the second resistor and may determine the CTAT current based on the second resistor and the CTAT voltage. The second non-linear compensation circuit may determine the compensation voltage based on the PTAT current, the CTAT current, and the CTAT voltage.

In some embodiments, the first non-linear compensation circuit may determine a first portion of the compensation voltage based on the second resistor. The second non-linear compensation circuit may include a third resistor and may determine a second portion of the compensation voltage based on the third resistor.

In some embodiments, the compensation voltage may be a non-linear function with respect to a temperature, the first portion may correspond to a vertex of the non-linear function, and the second portion may correspond to a curvature of the non-linear function.

In some embodiments, the second non-linear compensation circuit may be configured to generate the compensation current based on the PTAT current, the CTAT current, and the CTAT voltage. The reference voltage generating circuit may determine the compensation voltage based on the first resistor and the compensation current.

In some embodiments, the reference voltage generating circuit may include a first bipolar transistor and a second bipolar transistor, may determine the PTAT current based on a difference between an emitter-base voltage of the first bipolar transistor and an emitter-base voltage of the second bipolar transistor, and may transfer the PTAT current to the second bipolar transistor to determine the CTAT voltage. The second non-linear compensation circuit may include a third bipolar transistor and may determine the compensation current based on a difference between the emitter-base voltage of the second bipolar transistor and an emitter-base voltage of the third bipolar transistor.

The first non-linear compensation circuit may generate the CTAT current by mirroring a current determined based on the second resistor and the CTAT voltage.

In some embodiments, the second non-linear compensation circuit may receive the PTAT current by mirroring a current transferred to the output node.

In some embodiments, at least one of the first resistor or the second resistor may be a trimmable resistor.

A bandgap reference circuit according to some embodiments may include a first operational amplifier, a second operational amplifier, a first diode-connected transistor, a diode-connected second transistor, a diode-connected third transistor, a first resistor, a second resistor, a third resistor, a fourth resistor, a first current mirror, and a second current mirror. The first operational amplifier may include a first output terminal, a first input terminal connected to a first node, and a second input terminal connected to a second node. The first diode-connected transistor may be connected between the first node and a first power source. The second diode-connected transistor may be connected between the second node and the first power source. The third diode-connected transistor may be connected between a third node and the first power source. The second operational amplifier may include a second output terminal, a third input terminal connected to the second node, and a fourth input terminal connected to a fourth node. The first resistor may be connected between the second node and an output node at which a reference voltage is output, and the second resistor may be connected between the fourth node and the first power source. The third resistor may be connected between the third node and the second node, and the fourth resistor may be connected between the first node and the first diode-connected transistor. The first current mirror may be connected to a second power source and the first output terminal and may transfer a first current to the output node and the third node. The second current mirror may be connected to the second power source and the second output terminal and may transfer a second current to the third node and the fourth node.

According to some embodiments, an electronic device including processing circuitry which may generate a PTAT voltage and a CTAT voltage having a different temperature characteristic from the PTAT voltage, may generate a CTAT based on the CTAT voltage, determine a compensation voltage based on the CTAT current, generate a reference voltage based on the PTAT voltage, the CTAT voltage, and the compensation voltage, and generate a signal based on the reference voltage.

DETAILED DESCRIPTION OF THE EMBODIMENTS

Figure 1:
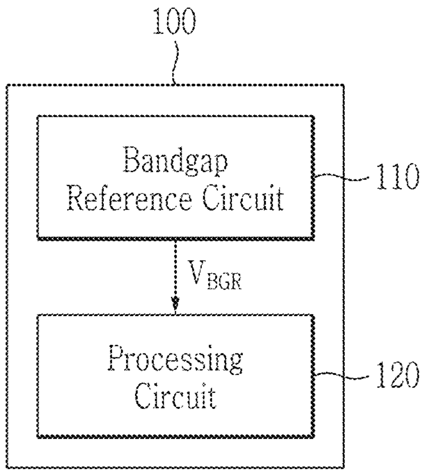
FIG. 1 is an example block diagram of a semiconductor device according to at least one embodiment.

In the following detailed description, only certain embodiments of the present invention have been shown and described, simply by way of illustration. As those skilled in the art would realize, the described embodiments may be modified in various different ways, without departing from the spirit or scope of the present invention. Functional elements in the following description and the corresponding blocks shown in the drawings, unless indicated otherwise, may be implemented in processing circuitry such as hardware, software, or a combination thereof configured to perform a specific function. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., and/or the processing circuitry may include electrical components such as at least one of transistors, resistors, capacitors, etc., and/or may include electrical components such as logic gates including at least one of AND gates, OR gates, NOR gates, NAND gates, NOT gates, XOR gates, etc.

Accordingly, the drawings and description are to be regarded as illustrative in nature and not restrictive. Like reference numerals designate like elements throughout the specification. The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although numerical terms first, second, and/or the like may be used herein to describe various elements, components, steps and/or operations, these terms are only used to distinguish one element, component, step or operation from another element, component, step, or operation.

FIG. 1 is an example block diagram of a semiconductor device according to at least one embodiment.

Referring to FIG. 1, the semiconductor device 100 may include a bandgap reference circuit 110 and a processing circuit 120. The semiconductor device 100 may be a semiconductor device such as a semiconductor chip included in various electronic devices (such as, e.g., a display device, a computing device, a digital camera, and/or the like). The semiconductor device 100 may generate a data signal based on a power source voltage supplied, e.g., from the electronic device.

The bandgap reference circuit 110 may generate a reference voltage $V_{BGR}$ based on the power source voltage. The reference voltage $V_{BGR}$ may be a bandgap reference voltage. The reference voltage $V_{BGR}$ may be a voltage used for an operation of the processing circuit 120.

The processing circuit 120 may generate the data signal based on the reference voltage $V_{BGR}$ from the bandgap reference circuit 110. The processing circuit 120 may include, for example, at least one of an analog circuit operating in an analog domain, a digital circuit operating in a digital domain, and/or an analog-to-digital conversion circuit of converting an analog signal into a digital signal. In some embodiments, the processing circuit 120 may generate the data signal using the reference voltage for comparison with another voltage.

Figure 2:
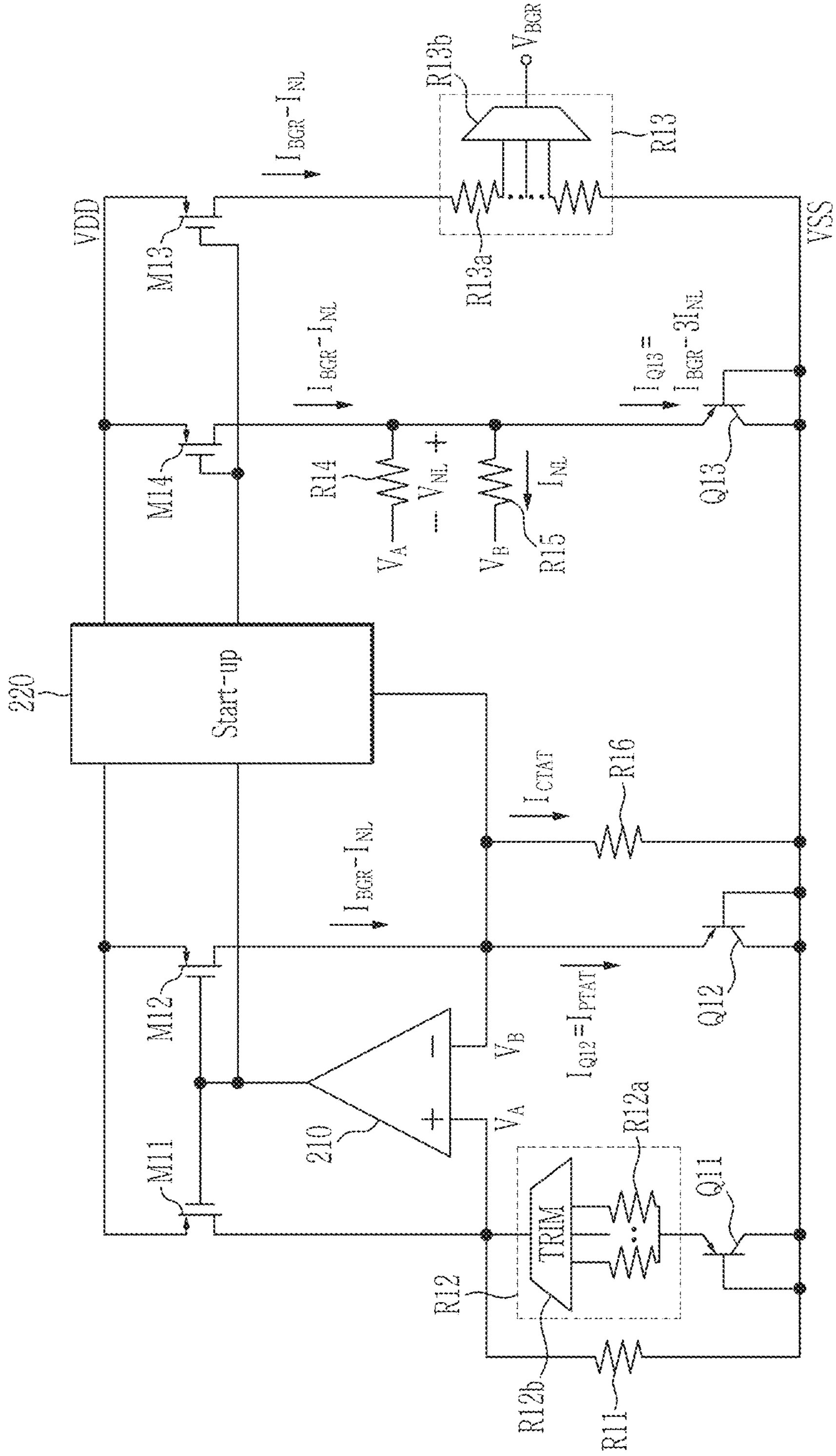
FIG. 2 is a drawing showing an example of a bandgap reference circuit.
Figure 3A:
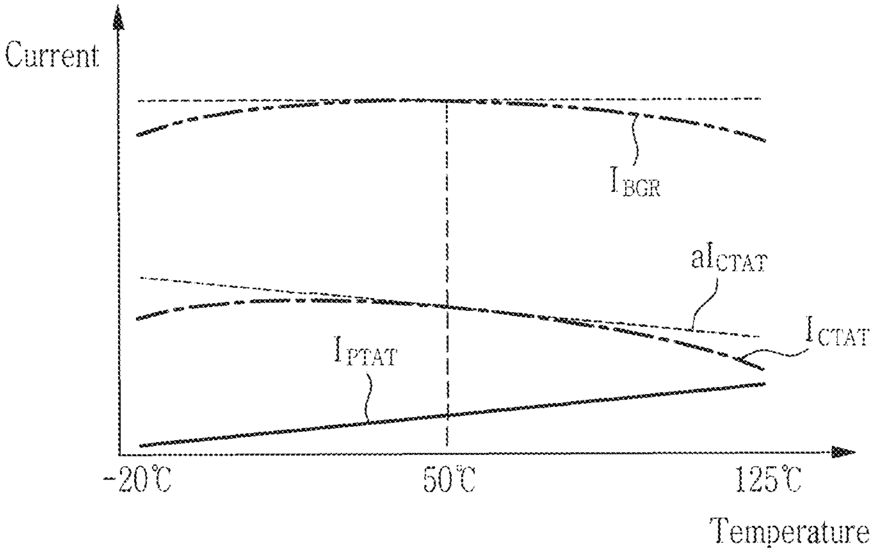
FIG. 3A and FIG. 3B each are a drawing explaining slope setting of a CTAT current in the bandgap reference circuit shown in FIG. 2.
Figure 3B:
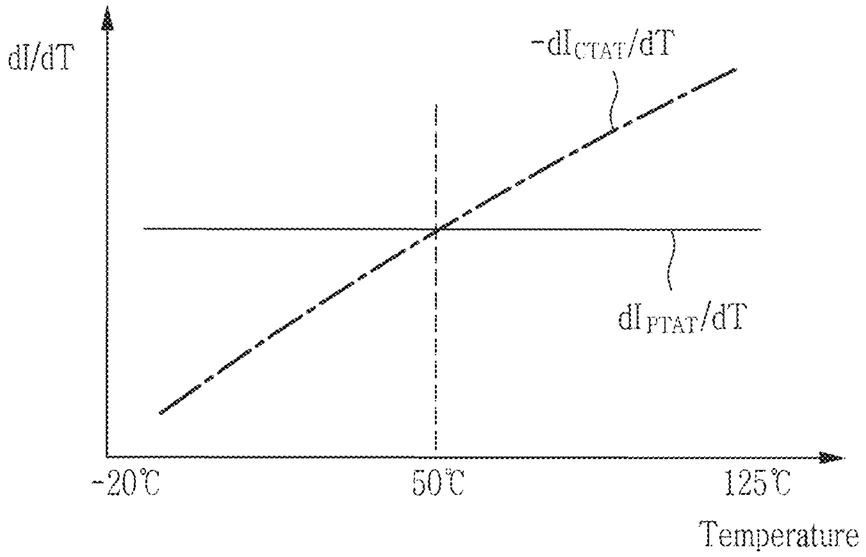

FIG. 2 is a drawing showing an example of a bandgap reference circuit; FIG. 3A and FIG. 3B each are a drawing explaining slope setting of a CTAT current in the bandgap reference circuit shown in FIG. 2; and FIG. 4 and FIG. 5 each are a drawing explaining compensation of a non-linear component in the bandgap reference circuit shown in FIG. 2.

Referring to FIG. 2, a bandgap reference circuit 200 may include a plurality of transistors (e.g., transistors Q11, Q12, and Q13 and transistors M11, M12, M13, and M14), an operational amplifier 210, and resistors R11, R12, 13, R14, R15, and R16. The transistors Q11, Q12, and Q13 may be bipolar transistors (such as PNP bipolar junction transistors (BJT)), and the transistors M11, M12, M13, and M14 may be metal oxide semiconductor (MOS) transistors (such as PMOS transistors). An emitter area of the transistor Q11 may be N times an emitter area of the transistor Q12, and an emitter area of the transistor Q13 may have the same size as the emitter area of transistor Q12. The resistors R12 and R13 may be trimmable resistors. For example, the resistor R12 may include a resistor network R12*a* and a trimming circuit R12*b*, and the resistor R13 may also include a resistor network R13*a* and a trimming circuit R13*b*.

In the bandgap reference circuit 200, a difference $\Delta V_{EB}$ between an emitter-base voltage $V_{EB2}$ of the transistor Q12 and an emitter-base voltage $V_{EB1}$ of the transistor Q11 may be given as $V_T\ln(N)$. Here, VT denotes a thermal voltage which is given as kT/q, wherein k denotes a Boltzmann constant, T denotes an absolute temperature, and q denotes a charge quantity of electrons. Since the operational amplifier 210 makes voltages $V_A$ and $V_B$ of two input terminals of the operational amplifier 210 equal, if resistances of the two resistors R11 and R16 are the same, a current $I_{Q12}$ flowing through the transistor Q12 and a current $I_{CTAT}$ flowing the resistor R16 may be given as in Equations 1 and 2, respectively. Since the transistor M13 is connected to the transistors M11 and M12 in the form of a current mirror, a current $I_{BGR}$ flowing through the resistor R13 may be given as a sum of the two currents $I_{Q12}$ and $I_{CTAT}$ as in Equation 3. A voltage $V_{BGR}$ determined by the resistor R13 may be an output voltage of the bandgap reference circuit 200 as in Equation 4. The output voltage $V_{BGR}$ may also be referred to as a reference voltage.

$$I_{Q12} = I_{PTAT} = \frac{V_T\ln(N)}{R_2} \quad \text{Equation 1}$$

$$I_{CTAT} = \frac{V_{EB2}}{R_1} \quad \text{Equation 2}$$

$$I_{BGR} = I_{PTAT} + I_{CTAT} = \frac{V_T\ln(N)}{R_2} + \frac{V_{EB2}}{R_1} \quad \text{Equation 3}$$

$$V_{BGR} = I_{BGR}R_4 = V_T\left(\frac{R_3\ln(N)}{R_2}\right) + V_{EB}\left(\frac{R_3}{R_1}\right) = V_{PTAT} + V_{CTAT} \quad \text{Equation 4}$$

In Equations 1 to 4, R1, R2, and R3 denote the resistances of the resistors R11, R12, and R13, respectively.

The current $I_{Q12}$ flowing through the transistor Q12 is a current due to the difference $\Delta V_{EB}$ of the emitter-base voltages and may be a proportional to absolute temperature (PTAT) current $I_{PTAT}$. Since the emitter-base voltage $V_{EB2}$ of the transistor Q12 is approximately inversely proportional to the temperature, the current $I_{CTAT}$ flowing through the resistor R16 may compensate for a temperature dependency in the PTAT current $I_{PTAT}$. The current $I_{CTAT}$ flowing through the resistor R16 may be referred to as a complementary to absolute temperature (CTAT) current. In the output voltage $V_{BGR}$ of the bandgap reference circuit 200, the voltage due to the PTAT current $I_{PTAT}$ may be called a PTAT voltage $V_{PTAT}$, and a voltage due to the CTAT current $I_{CTAT}$ may be called a CTAT voltage $V_{CTAT}$. Accordingly, if the slopes of the PTAT current $I_{PTAT}$ and the CTAT current $I_{CTAT}$ are similar, the current $I_{BGR}$ flowing through the resistor R13 (e.g., the output voltage $V_{BGR}$) may be independent of the temperature. In this case, the slope of the PTAT current $I_{PTAT}$ is a linear component with respect to the temperature and may be adjusted by the resistor R12.

In the bipolar transistor, the emitter-base voltage $V_{EB}$(T) according to the temperature may be given as in Equation 5. In Equation 5, $V_{G0r}$ denotes a constant component, $$\left(\frac{V_{EB}(T_r) - v_{G0r}}{T_r}\right)$$

T is a linear component with respect to the temperature, and $(\eta-\alpha)V_T + 1n$ $$\left(\frac{T}{T_r}\right)$$

is a non-linear component with respect to the temperature. Therefore, when the slope of the PTAT current $I_{PTAT}$ is adjusted (e.g., by adjusting the resistance of the resistor R12) the linear component of the emitter-base voltage $V_{EB}$(T) may be compensated, but the non-linear component of the emitter-base voltage $V_{EB}$(T) may not be compensated. That is, even if the slope of the PTAT current $I_{PTAT}$ at a target temperature (e.g., 50° C.) and the slope of the CTAT current aICTAT approximated at the target temperature are set similarly by adjusting the resistance of the resistor R12 as shown in FIG. 3A, the slope $dI_{PTAT}/dT$ of the PTAT current $I_{PTAT}$ and the slope dICTAT/dT of the CTAT current $I_{CTAT}$ may be different from each other due to the non-linear component when the temperature moves away from the target temperature. Accordingly, the current $I_{BGR}$ flowing through the resistor R13 may not have the temperature-independent characteristic in a wide temperature region.

On the other hand, in the bandgap reference circuit 200, the emitter-base voltage $V_{EB,PTAT}$ (T) may be given as in Equation 6 when the PTAT current (α=1) is applied as a collector current of the transistor Q12, and the emitter-base voltage $V_{EB,BGR}$ (T) may be given as in Equation 7 when the temperature-independent current (α=0) is applied as the collector current of the transistor Q12. Therefore, as in Equation 8, the non-linear component of Equation 5 may be calculated through the difference ($V_{EB,PTAT}$ (T)-$V_{EB,BGR}$ (T)) between the two voltages.

$$V_{EB}(T) = V_{G0r} + \left(\frac{V_{EB}(T_r) - V_{G0r}}{T_r}\right)T - (\eta - \alpha)V_T\ln\left(\frac{T}{T_r}\right) \quad \text{Equation 5}$$

$$V_{EB,PTAT}(T) = V_{G0r} + \left(\frac{V_{EB}(T_r) - V_{G0r}}{T_r}\right)T - (\eta - 1)V_T\ln\left(\frac{T}{T_r}\right) \quad \text{Equation 6}$$

$$V_{EB,BGR}(T) = V_{G0r} + \left(\frac{V_{EB}(T_r) - V_{G0r}}{T_r}\right)T - \eta V_T\ln\left(\frac{T}{T_r}\right) \quad \text{Equation 7}$$

$$V_{EB,PTAT}(T) - V_{EB,BGR}(T) = V_T\ln\left(\frac{T}{T_r}\right) \quad \text{Equation 8}$$

In Equations 5 to 8, $V_{G0r}$ denotes a bandgap voltage at (and/or approximating) absolute zero (e.g., a temperature of OK), $T_r$ denotes a reference temperature, η denotes a parameter related to a change in a temperature of a mobility, and a denotes a power of a temperature dependency of the collector current.

Referring to FIG. 2 again, the current $IQ_{12}$ of the transistor Q12 may be proportional to the temperature, and the current of the transistor M12 may be approximately independent of the temperature. Accordingly, the bandgap reference circuit 200 may transfer the current of the transistor M12 into the transistor Q13 by mirroring the current of the transistor M12 through the transistor M14. In this case, the two resistors R14 and R15 may subtract a current flowing through the transistor M14. If resistances of the two resistors R14 and R15 are the same, and a current flowing through each of the resistors R14 and R15 is $I_{NL}$, the current flowing through the transistors M12 and M14 may become ($I_{BGR}$-$I_{NL}$), and the current $I_{Q13}$ flowing through the transistor Q13 may become ($I_{BGR}$-3$I_{NL}$), and finally the current of ($I_{BGR}$-$I_{NL}$) may be delivered to the resistor R13 through the transistor M13.

Figure 4:
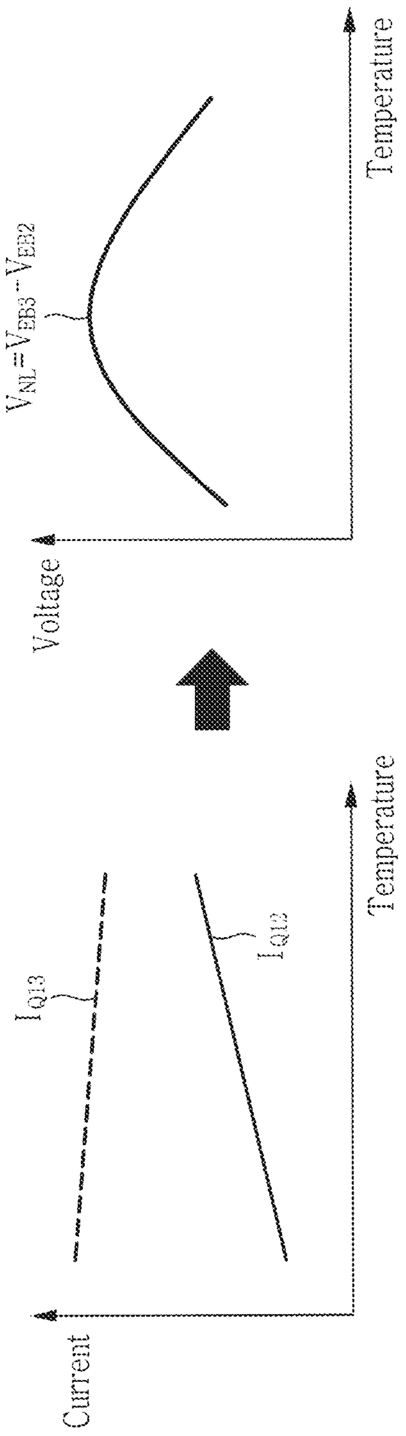
FIG. 4 and FIG. 5 each are a drawing explaining compensation of a non-linear component in the bandgap reference circuit shown in FIG. 2.

As shown in FIG. 4, the current $IQ_{12}$ of the transistor Q12 may be proportional to the temperature, and the current $IQ_{13}$ of the transistor Q13 may be approximately independent of the temperature. In FIG. 4, for convenience, the two currents $IQ_{12}$ and $IQ_{13}$ are shown as a straight line that can show an approximate change trend. The $I_{NL}$ current may be proportional to the difference $V_{NL}$ between the emitter-base voltage $V_{EB2}$ of the transistor Q12 and the emitter-base voltage $V_{EB3}$ of the transistor Q13. The emitter-base voltage $V_{EB2}$ of the transistor Q12 may correspond to a case where the PTAT current is applied as the collector current $IQ_{12}$, and the emitter-base voltage $V_{EB3}$ of the transistor Q13 may correspond to a case where the temperature-independent current is applied as the collector current $IQ_{13}$. In this case, the difference $V_{NL}$ between the emitter-base voltage $V_{EB2}$ of the transistor Q12 and the emitter-base voltage $V_{EB3}$ of the transistor Q13 may be given as shown in FIG. 4.

Figure 5:
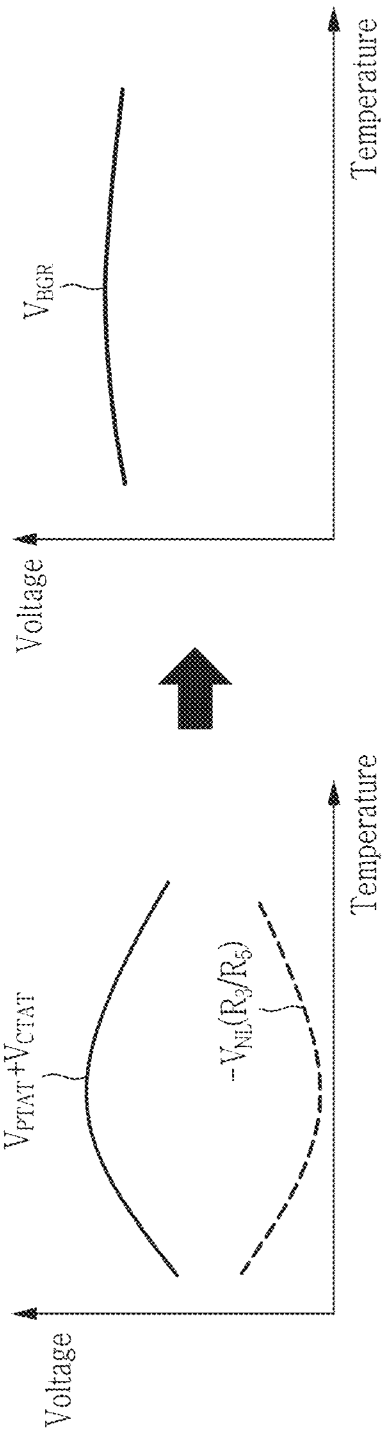

Therefore, as shown in FIG. 5, the non-linear component may be controlled (e.g., curvature compensation may be performed) through the $I_{NL}$ current (e.g., through the resistor R15 and the difference $V_{NL}$ between the emitter-base voltages). The output voltage $V_{BGR}$ of Equation 8 may be given as shown in Equation 9 and FIG. 5 due to the voltage $V_{NL}$.

Equation 9

$$V_{BGR} = (I_{BGR} - I_{NL})R_4 = (I_{PTAT} + I_{CTAT} - I_{NL})R_4 = V_{PTAT} + V_{CTAT} - V_{NL}\left(\frac{R_3}{R_5}\right)$$

In Equation 9, R5 denotes the resistance of the resistor R15.

If a vertex (e.g., a peak point) of the voltage ($V_{PTAT}$+$V_{CTAT}$) does not match a vertex of the voltage $V_{NL}$, the vertex of the voltage $V_{NL}$ may be moved by adjusting the slope of the current $IQ_{13}$ of the transistor Q13. However, the slope of the current $IQ_{13}$ of the transistor Q13 can be adjusted by adjusting the resistance of the resistor R12. When the resistance of the resistor R12 is adjusted, the slope of the PTAT current $I_{PTAT}$ may be changed, so that the voltage ($V_{PTAT}$+$V_{CTAT}$) may be changed. As such, when the non-linear compensation is performed in the bandgap reference circuit 200, it may be difficult to fine-tune the non-linear compensation since the non-linear compensation affects the linear compensation. Accordingly, even when the resistance R2 of the resistor R12 is adjusted, a difference between a maximum value and a minimum value of the output voltage $V_{BGR}$ depending on the temperatures may exceed a threshold.

Further, in the bandgap reference circuit 200, a current may flow through the resistors R11 and R12 even when the transistors Q11 and Q12 are off. As a result, at start-up, voltages of the two nodes $V_A$ and $V_B$ may not reach a target voltage due to voltages of the resistors R11 and R12. Accordingly, to prevent such a startup issue, a separate startup circuit 220 may be provided in the bandgap reference circuit 200.

Furthermore, when the trimming circuit R12*b* is used to adjust the resistance of the resistor R12, a transmission gate of the trimming circuit R12*b* may be provided to the resistor network R12*a* and may be positioned on a current path of the resistor R12. Since a resistance of the transmission gate is also included in the resistance of the resistor R12, when a voltage of a power source VDD varies, the resistance of the resistor R12 may also change so that the temperature characteristic of the output voltage $V_{BGR}$ may change.

Figure 6:
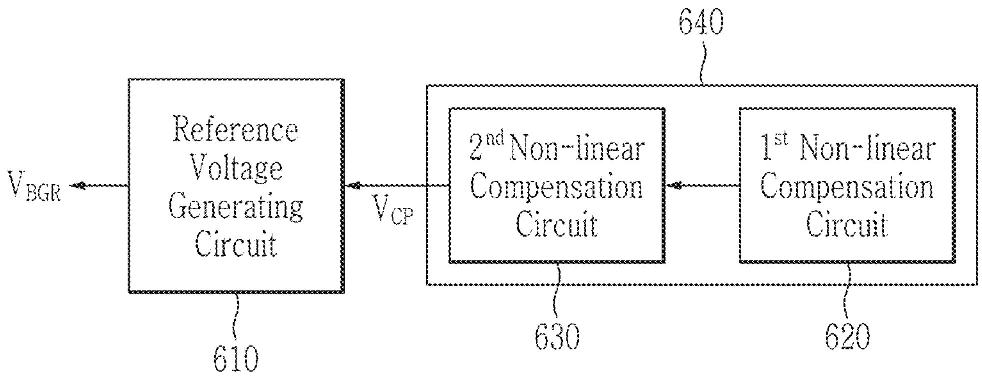
FIG. 6 is an example drawing showing a bandgap reference circuit according to at least one embodiment.

FIG. 6 is an example drawing showing a bandgap reference circuit according to at least one embodiment.

Referring to FIG. 6, a bandgap reference circuit 600 may include a reference voltage generation circuit 610 and a compensation circuit 640.

The reference voltage generation circuit 610 may generate a PTAT current and/or generate a PTAT voltage based on the PTAT current. In addition, the reference voltage generation circuit 610 may generate a CTAT voltage having a different temperature characteristic from the PTAT voltage, and generate an output voltage (e.g., the reference voltage) $V_{BGR}$ at an output node based on the PTAT voltage, the CTAT voltage and a compensation voltage $V_{CP}$. The reference voltage generation circuit 610 may output the reference voltage $V_{BGR}$ generated at the output node through an output terminal. The reference voltage generating circuit 610 may compensate for a linear component, e.g., according to temperature changes in the reference voltage $V_{BGR}$. In some embodiments, the reference voltage generating circuit 610 may adjust the compensation of the linear component according to temperature changes by adjusting the PTAT voltage. In some embodiments, the compensation voltage $V_{NL}$ may be a non-linear compensation value for compensating for a non-linear component of the temperature characteristic of the reference voltage $V_{BGR}$. For example, the compensation voltage $V_{NL}$ may be determined as a non-linear function with respect to temperature. Accordingly, the reference voltage generating circuit 610 may compensate for the non-linear component of the temperature characteristic of the reference voltage $V_{BGR}$ (and/or the CTAT voltage) based on the compensation voltage $V_{CP}$. In some embodiments, the reference voltage generating circuit 610 may determine the compensation voltage $V_{CP}$ based on a compensation current (or a "second current") and a first resistor.

In some embodiments, the reference voltage generation circuit 610 may include two bipolar transistors (e.g., a "first bipolar transistor" and a "second bipolar transistor") having emitter areas of different sizes. The reference voltage generation circuit 610 may generate a PTAT current based on a difference between emitter-base voltages of the first and second bipolar transistors, and generate the CTAT voltage by transferring the PTAT current to the second bipolar transistor.

The compensation circuit 640 may generate a CTAT current having a different temperature characteristic from the PTAT current (and/or the PTAT voltage) based on the CTAT voltage and generate the compensation current and the compensation voltage $V_{CP}$ based on the CTAT current. In some embodiments, the compensation circuit 640 may include a first non-linear compensation circuit 620 and a second non-linear compensation circuit 630.

The first non-linear compensation circuit 620 may generate the CTAT current for compensating the temperature characteristic of the PTAT current based on the CTAT voltage and compensate for the non-linear component according to temperature changes in the reference voltage $V_{BGR}$ based on the CTAT current. In some embodiments, the first non-linear compensation circuit 620 may determine a portion of the compensation voltage $V_{CP}$ based on the CTAT current. The portion of the compensation voltage $V_{CP}$ may be a vertex of a non-linear function with respect to temperature. In some embodiments, the first non-linear compensation circuit 620 may include a second resistor to which the CTAT voltage is transferred and adjust the CTAT current based on a resistance of the second resistor. In some embodiments, the first non-linear compensation circuit 620 may determine the CTAT current by mirroring a current flowing through the second resistor to which the CTAT voltage is transferred. Accordingly, the first non-linear compensation circuit 620 may determine the portion of the compensation voltage $V_{CP}$ based on the second resistor.

The second non-linear compensation circuit 630 may determine the compensation current and the compensation voltage $V_{CP}$ based on the PTAT current, the CTAT current, and the CTAT voltage. In some embodiments, the second non-linear compensation circuit 630 may receive the PTAT current by mirroring a current transferred to the output node of the reference voltage generation circuit 610. The second non-linear compensation circuit 630 may a current (hereinafter referred to as a "BGR current") whose temperature characteristic is compensated based on the mirrored current and the CTAT current generated by the first non-linear compensation circuit 620, generate the compensation current and the compensation voltage $V_{CP}$ based on the CTAT voltage and the BGR current, and provide the compensation voltage $V_{CP}$ to the reference voltage generation circuit 610. In some embodiments, the second non-linear compensation circuit 630 may adjust a portion of the compensation voltage $V_{CP}$. For example, the portion of the compensation voltage $V_{CP}$ may be a curvature of the non-linear function with respect to temperature. In some embodiments, the second non-linear compensation circuit 630 may include a third resistor and adjust the portion of the compensation voltage $V_{CP}$ based on a resistance of the third resistor.

In some embodiments, the second non-linear compensation circuit 630 may include a third bipolar transistor to which the BRG current is transferred. The second non-linear compensation circuit 630 may determine the compensation current based on the third resistor and a difference between an emitter-base voltage of the third bipolar transistor and an emitter-base voltage of the second bipolar transistor of the reference voltage generating circuit 610.

As described above, in the bandgap reference circuit 600, the reference voltage generating circuit 610 may compensate for the linear component, and the first non-linear compensation circuit 620 and the second non-linear compensation circuit 630 may compensate for the non-linear component. Since a resistor different from a resistor used for the linear component is used for the compensation of the non-linear component, the compensation of the non-linear component may not affect the compensation of the linear component. In addition, since the curvature and the vertex of the non-linear component may be separately compensated, the non-linear component may be precisely compensated.

Figure 7:
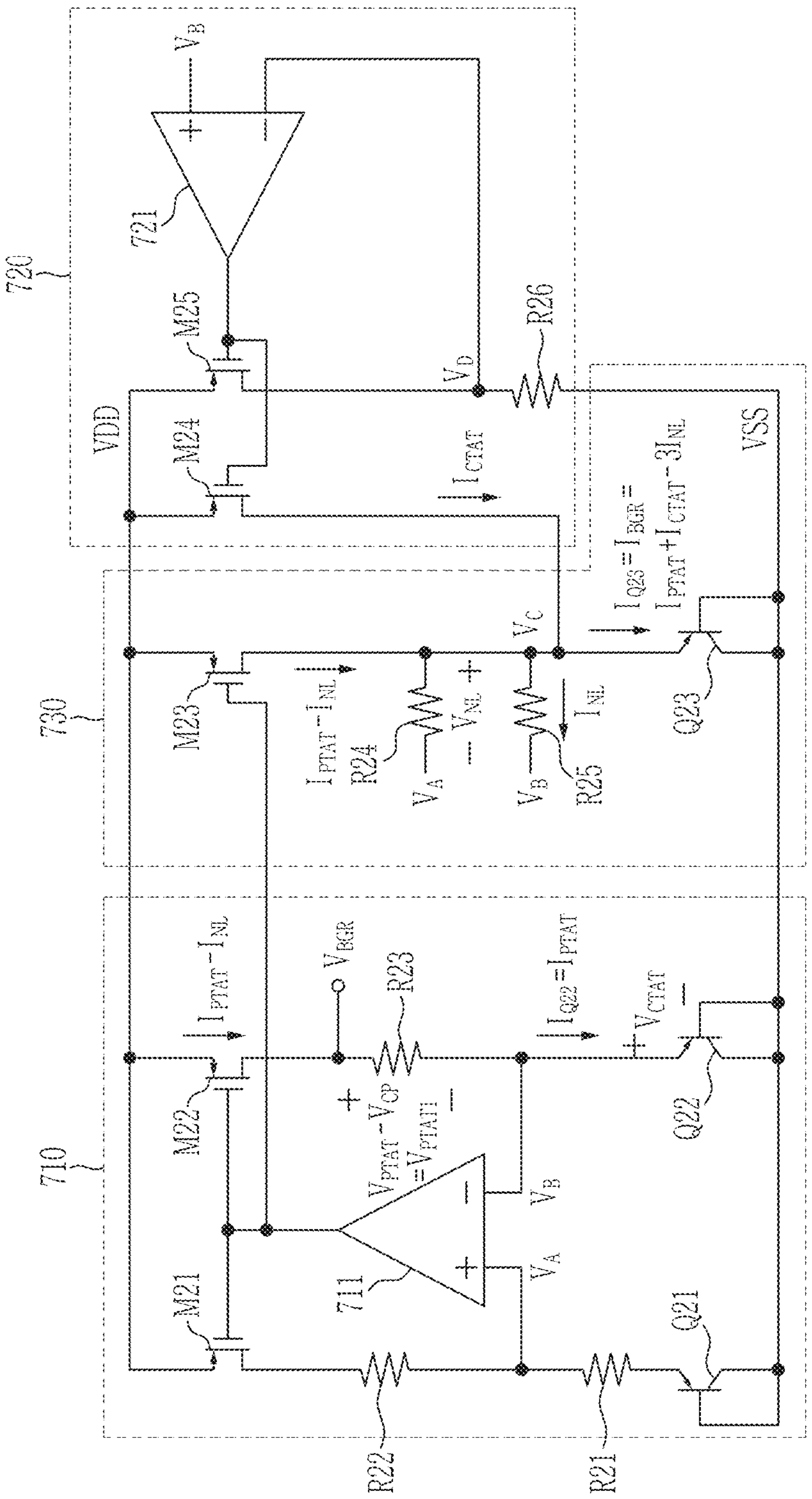
FIG. 7 is an example drawing showing a bandgap reference circuit according to at least one embodiment.
Figure 8:
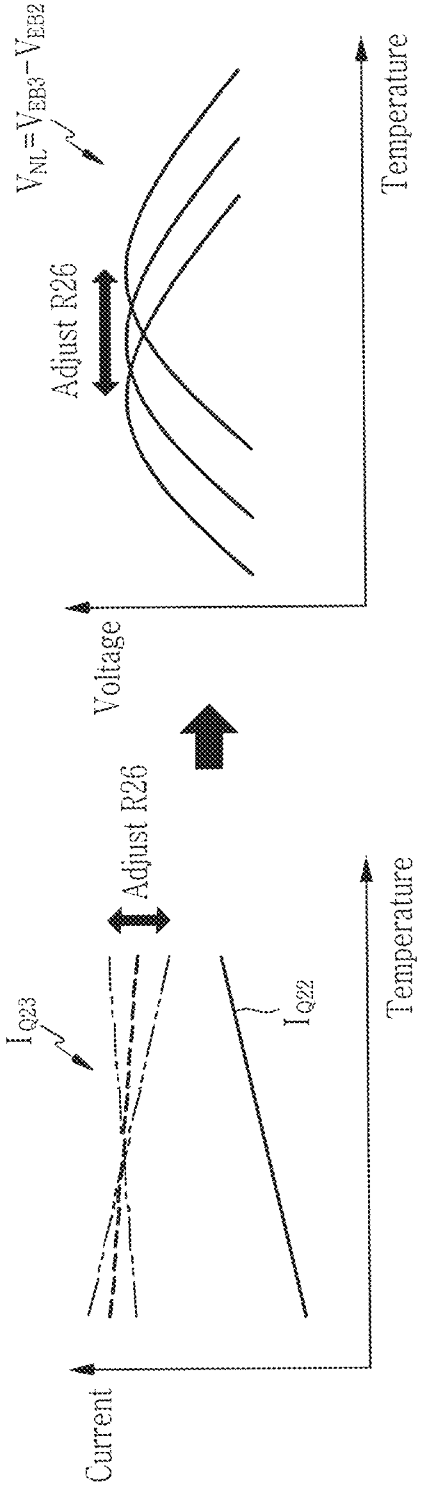
FIG. 8 and FIG. 9 each are drawings explaining compensation of a non-linear component in a bandgap reference circuit shown in FIG. 7.
Figure 9:
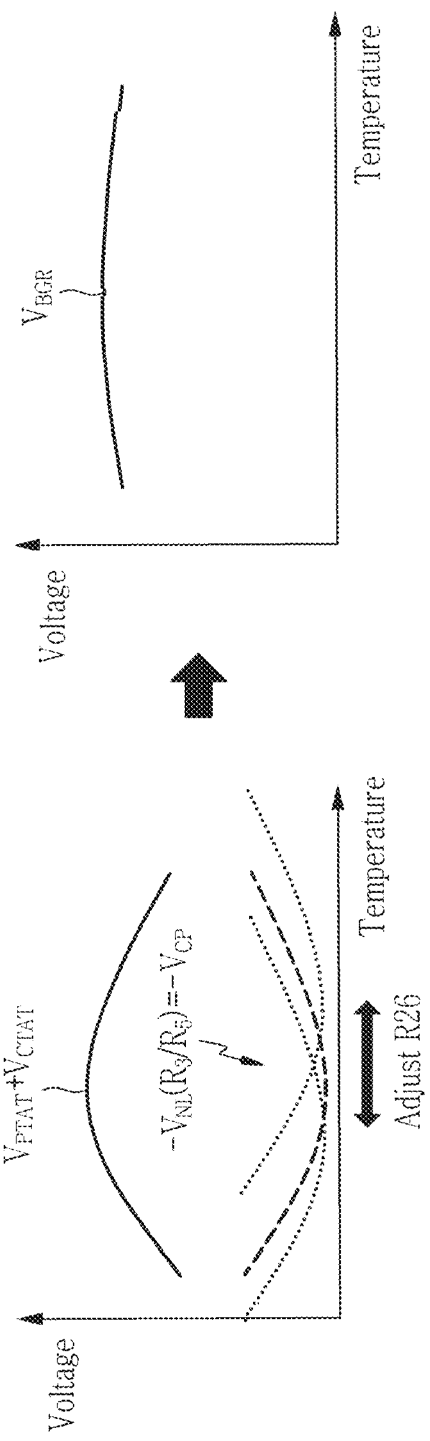
Figure 10A:
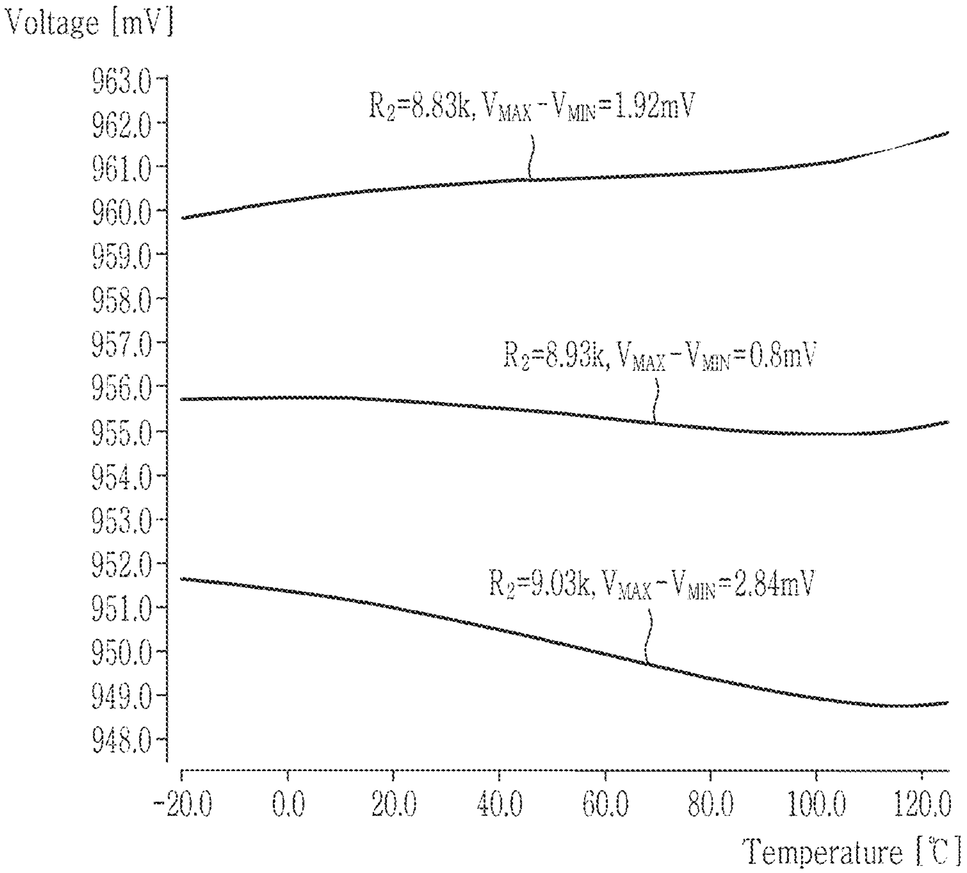
FIG. 10A is a drawing showing an example of reference voltage changes depending on adjustment of a resistance in a bandgap reference circuit shown in FIG. 2.
Figure 10B:
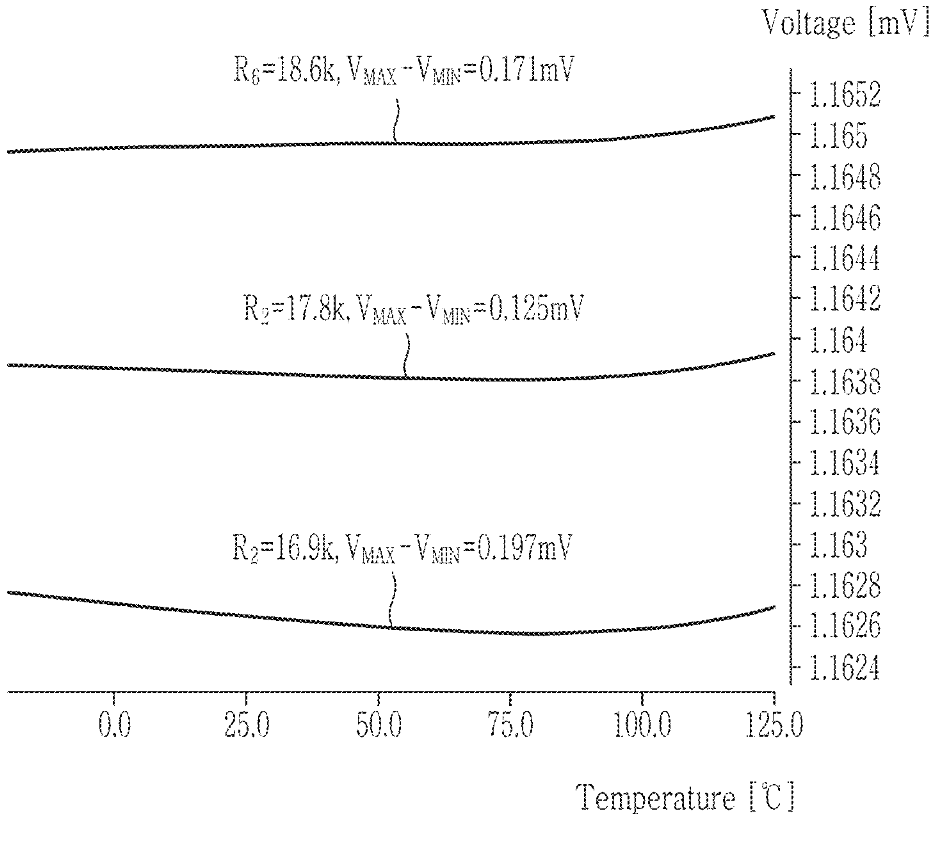
FIG. 10B is a drawing showing an example of reference voltage changes depending on adjustment of a resistance in a bandgap reference circuit shown in FIG. 7.

FIG. 7 is an example drawing showing a bandgap reference circuit according to at least one embodiment; and FIG. 8 and FIG. 9 each are a drawing explaining compensation of a non-linear component in a bandgap reference circuit shown in FIG. 7. FIG. 10A is a drawing showing an example of reference voltage changes depending on adjustment of a resistance in a bandgap reference circuit shown in FIG. 2, and FIG. 10B is a drawing showing an example of reference voltage changes depending on adjustment of a resistance in a bandgap reference circuit shown in FIG. 7.

Referring to FIG. 7, a bandgap reference circuit 700 may include a reference voltage generation circuit 710, a first non-linear compensation circuit 720, and a second non-linear compensation circuit 730. In at least one example embodiment, the reference voltage generation circuit 710, the first non-linear compensation circuit 720, and the second non-linear compensation circuit 730 may be the same (and/or substantially similar) to the reference voltage generation circuit 610, a first non-linear compensation circuit 620, and a second non-linear compensation circuit 630 of FIG. 6. The reference voltage generation circuit 710 may include transistors Q21 and Q22, transistors M21 and M22, an operational amplifier 711, and resistors R21, R22, and R23. The first non-linear compensation circuit 720 may include transistors M24 and M25, an operational amplifier 721, and a resistor R26, and the second non-linear compensation circuit 730 may include a transistor Q23, a transistor M23, and resistors R24 and R25.

In some embodiments, the transistors Q21, Q22, and Q23 may be bipolar transistors, and the transistors M21, M22, M23, M24, and M25 may be MOS transistors. For example, in some embodiments, the transistors Q21, Q22, and Q23 may be PNP BJTs, and the transistors M21, M22, M23, M24, and M25 may be PMOS transistors. Each of the transistors Q21, Q22, Q23, M21, M22, M23, M24, and M25 may have a first input terminal, a second input terminal and a control terminal. When the transistors Q21, Q22, and Q23 are the bipolar transistors, the first input terminal, the second input terminal, and the control terminal may be referred to as a collector, an emitter, and a base, respectively. When the transistors M21, M22, M23, M24, and M25 are the MOS transistors, the first input terminal, the second input terminal, and the control terminal may be referred to as a source, a drain, and a gate, respectively.

In the reference voltage generation circuit 710, each of the transistors Q21 and Q22 may be diode-connected. That is, the base and the collector may be connected to each other in each of the transistors Q21 and Q22. Further, collectors of the transistors Q21 and Q22 may be connected to a power source VSS. The power source VSS may be, for example, a ground terminal. Furthermore, an emitter area of the transistor (e.g., a "first transistor") Q21 may be N times an emitter area of the transistor (e.g., a "second transistor") Q22. N may denote a number greater than one. The resistor (e.g., a "fourth resistor") R21 may be connected between the emitter of the transistor Q21 and a node (e.g., a "first node") $V_A$, and the emitter of the transistor Q22 may be connected to a node (e.g., a "second node") $V_B$. The node $V_A$ may be connected to a positive input terminal of the operational amplifier (e.g., a "first operational amplifier") 711, and the node $V_B$ may be connected to a negative input terminal of the operational amplifier 711.

The sources of the transistors M21 and M22 may be connected to a power source VDD, and the gates of the transistors M21 and M22 may be connected to each other. The power source VDD may supply a higher voltage than the power source VSS. Further, the gates of the transistors M21 and M22 may be connected to an output terminal of the operational amplifier 711, and the transistors M21 and M22 may be controlled in response to an output of the operational amplifier 711. The resistor (e.g., a "fifth resistor") R22 may be connected between a node (e.g., a "fifth node") to which the drain of transistor M21 is connected and the node $V_A$. The drain of the transistor (e.g., a "fourth transistor") M22 may be connected to an output node at which a reference voltage $V_{BGR}$ is generated, and the resistor (e.g., a "first resistor") R23 may be connected between the output node and the node $V_B$. In some embodiments, the resistors R22 and R23 may have the same resistance.

In the second non-linear compensation circuit 730, the transistor (e.g., a "third transistor") Q23 may be diode-connected. For example, the base and the collector of the transistor Q23 may be connected to each other. Further, the collector of transistor Q23 may be connected to the power source VSS. Furthermore, an emitter area of the transistor Q23 may have the same size as the emitter area of transistor Q22. The source of the transistor (e.g., a "fifth transistor") M23 may be connected to the power source VDD, and the gate of the transistor M23 may be connected to the gates of the transistors M21 and M22. For example, the transistor M23 may form a current mirror that mirrors a current of the transistors M21 and M22. Further, the gate of the transistor M23 may be connected to the output terminal of the operational amplifier 711, and the transistor M23 may be controlled in response to the output of the operational amplifier 711. The drain of transistor M23 and the emitter of transistor Q23 may be connected at a node (e.g., a "third node") $V_C$. Further, the resistor (e.g., a "fifth resistor") R24 may be connected between the node $V_C$ and the node $V_A$, and the resistor (e.g., a "third resistor") R25 may be connected between the node $V_C$ and the node $V_B$. In some embodiments, the resistors R24 and R25 may have the same resistance.

In the first non-linear compensation circuit 720, the sources of the transistors M24 and M25 may be connected to the power source VDD, and the gates of the transistors M24 and M25 may be connected to each other. For example, the transistors M24 and M25 may form a current mirror. Further, the gates of the transistors M24 and M25 may be connected to an output terminal of the operational amplifier (e.g., a "second operational amplifier") 721, and the transistors M24 and M25 may be controlled in response to an output of the operational amplifier 721. The drain of the transistor (e.g., a "sixth transistor") M24 may be connected to the node $V_C$, the drain of the transistor (e.g., a "seventh transistor") M25 may be connected to a node (e.g., a "fourth node") $V_D$, and the resistor (e.g., a "second resistor") R26 may be connected between the node $V_D$ and the power source VSS. A positive input terminal of the operational amplifier 721 may be connected to the node $V_B$, and the negative input terminal of the operational amplifier 721 may be connected to the node $V_D$. Accordingly, a voltage of the resistor R26 may be transferred to the negative input terminal of the operational amplifier 721.

In the reference voltage generation circuit 710, a difference $\Delta V_{EB}$ between an emitter-base voltage $V_{EB2}$ of the transistor Q22 and an emitter-base voltage $V_{EB1}$ of the transistor Q21 may be given as $V_T\ln(N)$. Since currents flowing through the two transistors Q21 and Q22 are the same, the current $I_{Q22}$ flowing through the transistor Q22 may be given as in Equation 10. The current $I_{Q22}$ flowing through transistor Q22 may be proportional to temperature, so it may be called a PTAT current $I_{PTAT}$. Further, if a current flowing from the node $V_C$ to the node $V_A$ or $V_B$ is $I_{NL}$, a current flowing through the transistor M22 may be given as ($I_{PTAT}$-$I_{NL}$). Therefore, a voltage $V_{PTAT1}$ between both terminals of the resistor R23 may be given as in Equation 11. The voltage $V_{PTAT}$ in Equation 11 may be determined based on the PTAT current $I_{PTAT}$ and the resistor R23, so it may be called a PTAT voltage. Accordingly, the PTAT voltage $V_{PTAT}$ may be adjusted by a resistance R3 of the resistor R23. Further, in Equation 11, a voltage $V_{CP}$ may be referred to as a non-linear compensation voltage.

$$I_{Q12} = I_{PTAT} = \frac{V_T\ln(N)}{R_1} \qquad \text{Equation 10}$$

$$V_{PTAT1} = R_3\left(\frac{V_T\ln(N)}{R_1}\right) - I_{NL}R_3 = V_{PTAT} - I_{NL}R_3 = V_{PTAT} - V_{CP} \qquad \text{Equation 11}$$

In Equations 10 and 11, R1 and R3 denote resistances of the resistors R21 and R23, respectively.

In the second non-linear compensation circuit 730, the transistor M23 may mirror the current ($I_{PTAT}$-$I_{NL}$) corresponding to the PTAT current $I_{PTAT}$ flowing through the transistor M22 and supply the mirrored current to the transistor Q23. Since the current ($I_{PTAT}$-$I_{NL}$) has the same temperature dependency as the PTAT current $I_{PTAT}$, the first non-linear compensation circuit 720 may be provided to generate a CTAT current $I_{CTAT}$ having a different temperature dependency from the PTAT current $I_{PTAT}$. Since voltages of the two input terminals of the operational amplifier 721 become the same, a voltage across the resistor R26 (e.g., a voltage at the node $V_D$) may become equal to the emitter-base voltage $V_{EB2}$ of the transistor Q22. Accordingly, the current $I_{CTAT}$ flowing through the transistor M25 may be determined based on the emitter-base voltage $V_{EB2}$ of the transistor Q22 and the resistor R26 and may be given as in Equation 12. In addition, since the two transistors M24 and M25 form the current mirror, the same current $I_{CTAT}$ may flow through the transistors M24 and M25. Since the emitter-base voltage $V_{EB2}$ of the transistor Q22 has the different temperature dependency from the PTAT current $I_{PTAT}$, the emitter-base voltage $V_{EB2}$ of the transistor Q22 may be a CTAT voltage $V_{CTAT}$, and the current flowing through the transistors M24 and M25 may be a CTAT current $I_{CTAT}$. For example, the first non-linear compensation circuit 720 may generate the CTAT current $I_{CTAT}$ through the resistor R26 based on the voltage of the node $V_B$ (e.g., the emitter-base voltage $V_{CTAT}$ of the transistor Q22).

$$I_{CTAT} = \frac{V_{EB2}}{R_6} = \frac{V_{CTAT}}{R_6} \qquad \text{Equation 12}$$

In Equation 12, R6 denotes a resistance of the resistor R26.

The current ($I_{PTAT}$-$I_{NL}$) corresponding to the PTAT current $I_{PTAT}$ transferred through the transistor M23 and the CTAT current $I_{CTAT}$ transferred through the transistor M24 are combined, so that a BGR current $I_{BGR}$, which is approximately independent of the temperature, may be supplied to the transistor Q23. Meanwhile, since the compensation current $I_{NL}$ flows from the node $V_C$ to the node $V_A$ or $V_B$, the BGR current $I_{BGR}$ of the transistor Q23 may be given as in Equation 13. In this case, since the temperature dependency of the current $I_{PTAT}$ of the transistor Q22 is different from the temperature dependency of the current $I_{BGR}$ of the transistor Q23, the difference $V_{NL}$ between the emitter-base voltage $V_{EB3}$ of the transistor Q23 and the emitter-base voltage $V_{EB2}$ of the transistor Q23 may compensate for the non-linear component of the emitter-base voltage. The compensation current $I_{NL}$ may be determined based on the difference $V_{NL}$ between the emitter-base voltages of the two transistors Q23 and Q22, and the non-linear compensation voltage $V_{CP}$ for compensating for the non-linear component may be determined based on the compensation current $I_{NL}$.

The non-linear compensation voltage $V_{CP}$ may be given as a non-linear function with respect to temperature. Since the CTAT current $I_{CTAT}$ may be determined based on the resistance of the resistor R26 as shown in Equation 12, and the current $I_{Q23}$ of the transistor Q23 is determined based on the CTAT current $I_{CTAT}$ as shown in Equation 13, the non-linear compensation voltage $V_{CP}$ may be adjusted based on the CTAT current $I_{CTAT}$ (e.g., of the resistor R26). In the bandgap reference circuit 700, when the voltage $V_{NL}$ is connected to the node $V_B$ through the resistor R25, the compensation current $I_{NL}$ may flow through the resistor R25.

$$I_{Q23}=I_{BGR}=I_{PTAT}+I_{CTAT}-3I_{NL} \quad \text{Equation 13}$$

Based on the relationship described above, the reference voltage $V_{BGR}$ generated in the bandgap reference circuit 700 may be given as in Equation 14.

$$V_{BGR} = V_{PTAT} + V_{CTAT} - I_{NL}R_3 = v_{PTAT} + V_{CTAT} - V_{NL}\frac{R_3}{R_5} = V_{PTAT} + V_{CTAT} - V_{CP} \quad \text{Equation 14}$$

In Equation 14, $R_5$ denotes the resistance of the resistor R25.

As described above, the linear component in the reference voltage $V_{BGR}$ may be compensated by the PTAT voltage $V_{PTAT}$. In this case, the slope of the PTAT voltage $V_{PTAT}$ may be determined by adjusting the resistance $R_3$ of the resistor R23. In addition, since the current $I_{Q22}$ of the transistor Q22 (e.g., the PTAT current $I_{PTAT}$) may be proportional to the temperature and the current $I_{Q23}$ of the transistor Q23 (e.g., the BGR current $I_{BGR}$) may be approximately independent of the temperature, the non-linear component may be compensated through the non-linear compensation voltage $V_{CP}$.

As shown in FIG. 8, a slope according to the temperature in the current $I_{Q23}$ of the transistor Q23 may be controlled by adjusting the resistance of the resistor R26. Although the currents $I_{Q22}$ and $I_{Q23}$ of the transistors Q22 and Q23 are given in the form of curved lines with respect to temperature due to non-linear components, for convenience, the current $I_{Q22}$ and $I_{Q23}$ of the transistors Q22 and Q23 are shown in FIG. 8 as a straight line that can show an approximate change trend. The voltage $V_{NL}$ and the non-linear compensation voltage $V_{CP}$ may be given as non-linear functions with respect to temperature. When the slope according to temperature in the current $I_{Q23}$ of the transistor Q23 is controlled, positions of vertices of the curved lines of the voltage $V_{NL}$ and the non-linear compensation voltage $V_{CP}$ may move. Similarly, a sum of the PTAT voltage $V_{PTAT}$ and the CTAT voltage $V_{CTAT}$ may also be given as a non-linear function with respect to temperature. As shown in Equation 13, the reference voltage $V_{BGR}$ may be given as a value obtained by subtracting the non-linear compensation voltage $V_{CP}$ from the sum of the PTAT voltage $V_{PTAT}$ and the CTAT voltage $V_{CTAT}$. Therefore, as shown in FIG. 9, by adjusting the resistance of the resistor R26 to move the vertex of the non-linear compensation voltage $V_{CP}$ to correspond to a vertex of the sum of PTAT voltage $V_{PTAT}$ and CTAT voltage $V_{CTAT}$, the reference voltage $V_{BGR}$ can be made approximately independent of the temperature. In some embodiments, when curvature of the sum of the PTAT voltage $V_{PTAT}$ and the CTAT voltage $V_{CTAT}$ is different from curvature of the non-linear compensation voltage $V_{CP}$, the curvature of the non-linear compensation voltage $V_{CP}$ may be adjusted by adjusting the resistance of the resistor R25. In this case, since the adjustment of the resistor R26 or R25 does not affect the PTAT voltage $V_{PTAT}$ determined by the resistor R23, it is possible to prevent the compensation of the non-linear component from affecting the compensation of the linear component.

As discussed above, when the non-linear compensation is performed in the bandgap reference circuit 200 shown in FIG. 2, since the non-linear compensation affects the linear compensation, it may be difficult to fine-tune the non-linear compensation. For example, as shown in FIG. 10A, when the resistance R2 of the resistor R22 is adjusted to 8.83 kΩ, 8.93 kΩ, and 9.03 kΩ, a difference between a maximum value $V_{MAX}$ and a minimum value $V_{MIN}$ of the reference voltage $V_{BGR}$ depending on the temperatures may be 1.92 mV, 0.8 mV, and 2.84 mV, respectively. However, as described with reference to FIG. 7 to FIG. 9, in the case of compensating for the non-linear component by adjusting the resistance of the resistor R26, the difference between the maximum value and the minimum value of the reference voltage $V_{BGR}$, depending on the temperatures, may not exceed a threshold, such that the reference voltage $V_{BGR}$ may be approximately independent of the temperature. For example, as shown in FIG. 10B, when the resistance R6 is adjusted to 18.6 kΩ, 17.8 kΩ and 16.9 kΩ, the difference between the maximum value and the minimum value may be 0.171 mV, 0.125 mV and 0.197 mV, respectively. It can be seen that the difference between the maximum value and the minimum value is significantly smaller than that of the case shown in FIG. 10A.

Further, since the bandgap reference circuit 700 is a voltage-type bandgap reference circuit that generates the reference voltage $V_{BGR}$ based on the PTAT voltage $V_{PTAT}$ and the CTAT voltage $V_{CTAT}$, a current path may not be formed when the transistors Q21 and Q22 are off. Accordingly, a startup issue caused by the current path formed when the transistors are off may not occur.

Figure 11:
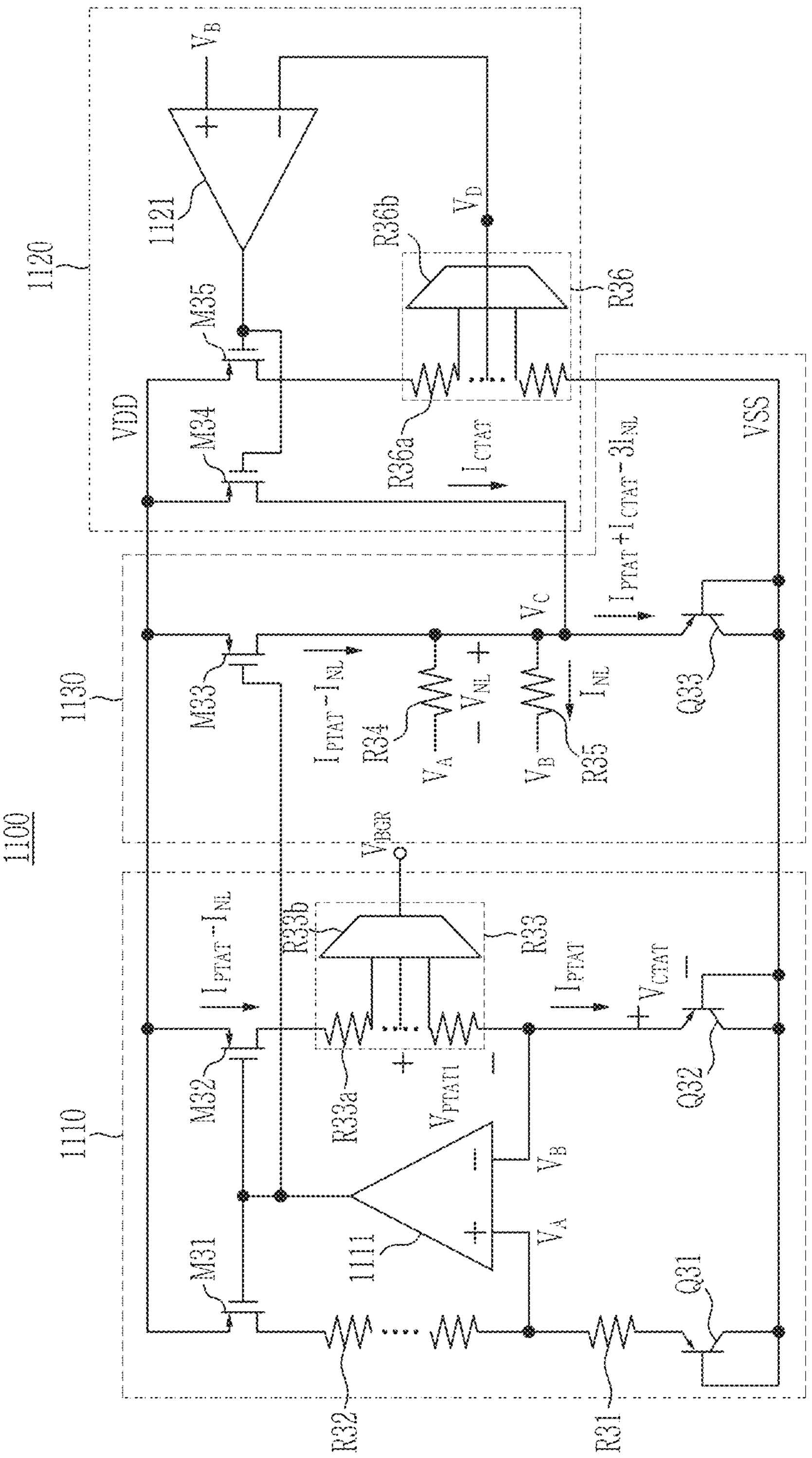
FIG. 11 is an example drawing showing a bandgap reference circuit according to at least one embodiment.
Figure 12A:
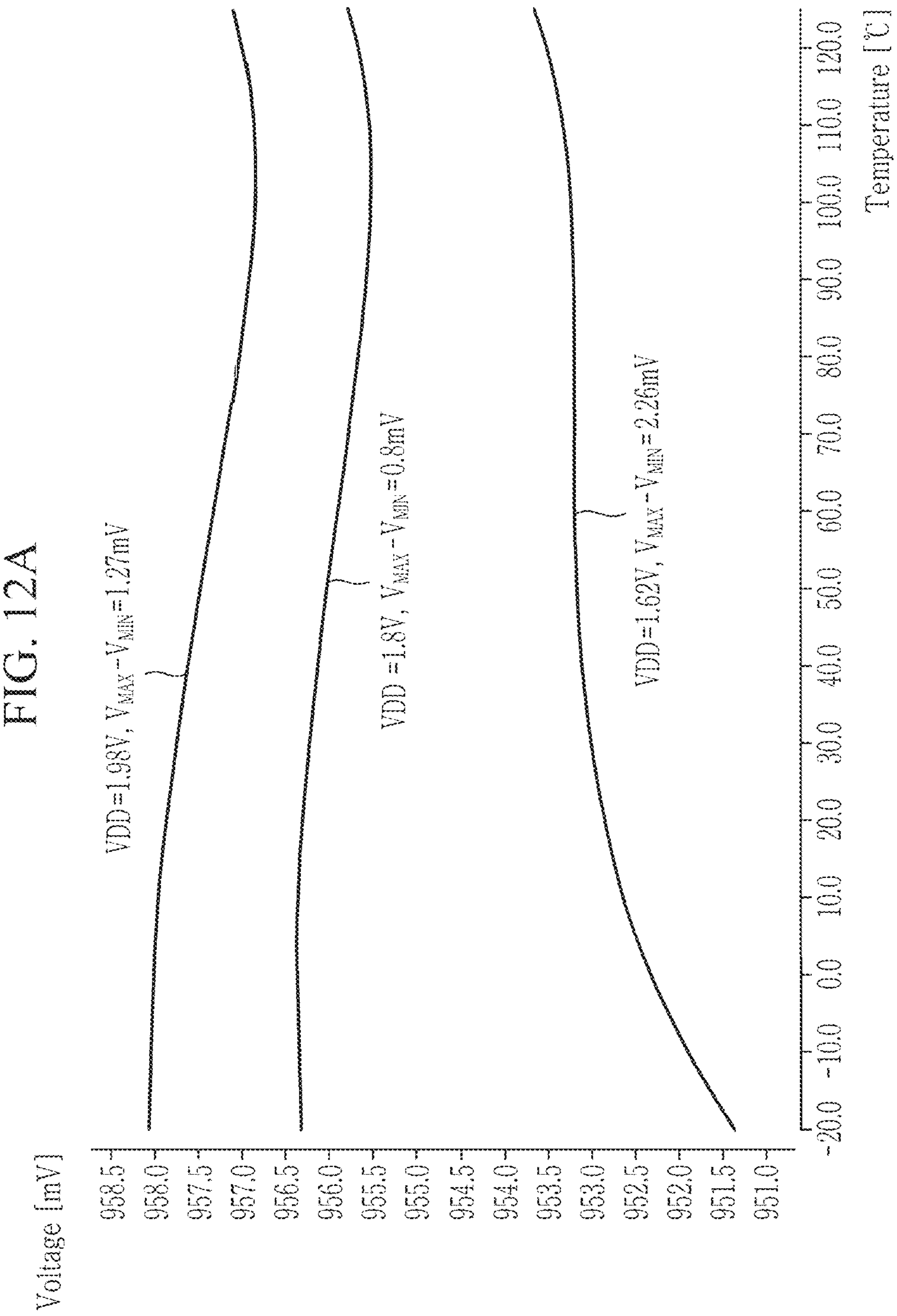
FIG. 12A is an example drawing showing reference voltage changes depending on a power source voltage in a bandgap reference circuit shown in FIG. 2.
Figure 12B:
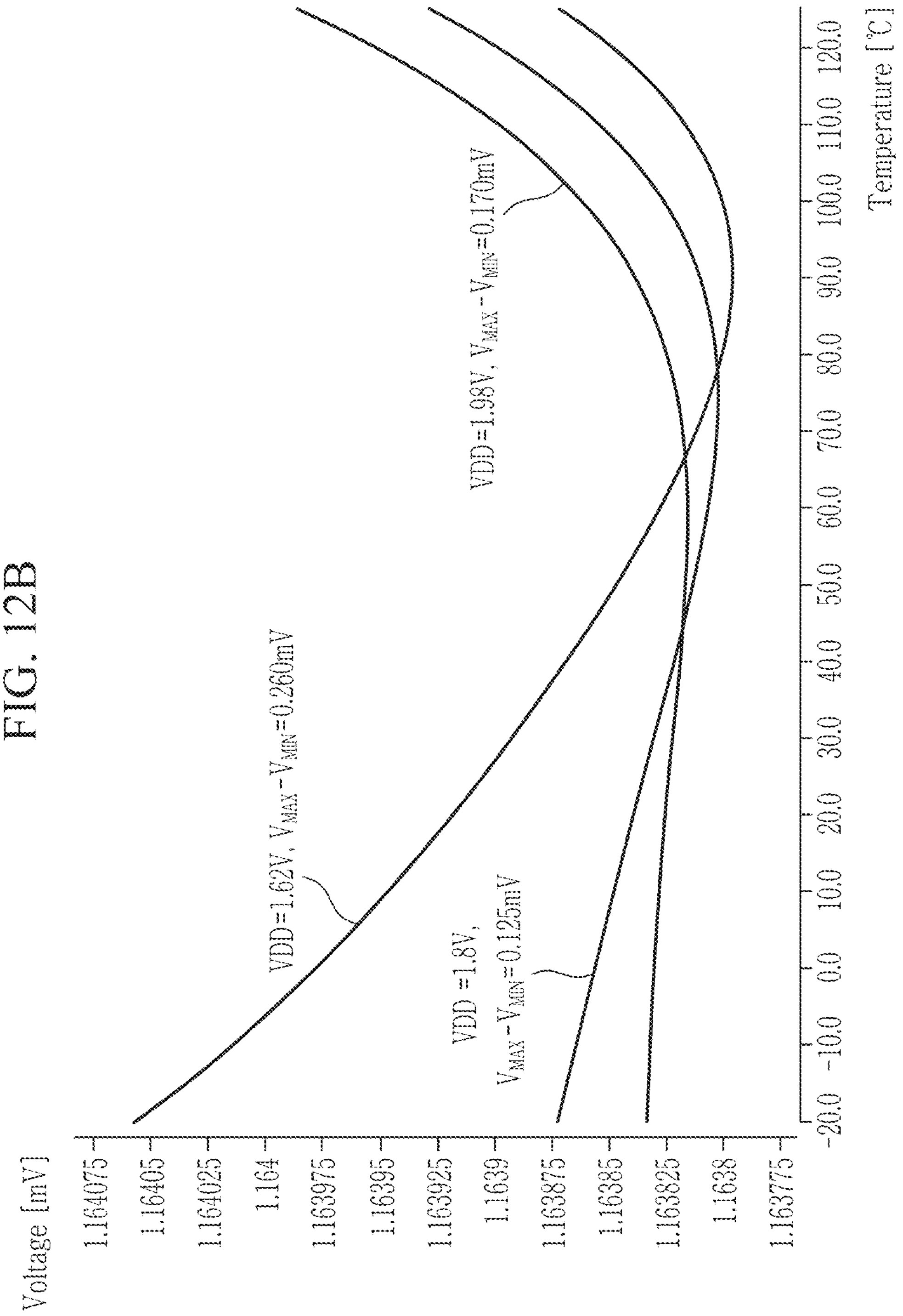
FIG. 12B is an example drawing showing reference voltage changes depending on a power source voltage in a bandgap reference circuit shown in FIG. 11.

FIG. 11 is an example drawing showing a bandgap reference circuit according to at least one embodiment; FIG. 12A is an example drawing showing reference voltage changes depending on a power source voltage in a bandgap reference circuit shown in FIG. 2; and FIG. 12B is an example drawing showing reference voltage changes depending on a power source voltage in a bandgap reference circuit shown in FIG. 11.

Referring to FIG. 11, a bandgap reference circuit 1100 may include a reference voltage generation circuit 1110, a first non-linear compensation circuit 1120, and a second non-linear compensation circuit 1130. In at least one example embodiment, the reference voltage generation circuit 1110, the first non-linear compensation circuit 1120, and the second non-linear compensation circuit 1130 may be the same (and/or substantially similar) to the reference voltage generation circuit 610, a first non-linear compensation circuit 620, and a second non-linear compensation circuit 630 of FIG. 6. The reference voltage generation circuit 1110 may include transistors Q31 and Q32, transistors M31 and M32, an operational amplifier 1111, and resistors R31, R32, and R33. The first non-linear compensation circuit 1120 may include transistors M34 and M35, an operational amplifier 1121, and a resistor R36, and the second non-linear compensation circuit 1130 may include a transistor Q33, a transistor M33, and resistors R34 and R35.

Since connection relationships between transistors Q31, Q32, Q33, M31, M32, M33, M34, and M35, the operational amplifiers 1111 and 1121, and resistors R31, R32, R33, R34, R35, and R36 can be easily known from the at least one embodiment described with reference to FIG. 7, the description thereof is omitted.

The resistors R33 and R36 may each be a trimmable resistor. In some embodiments, the resistor R32 may also be a trimmable resistor to have the same resistance as the resistor R23. Therefore, as described with reference to FIG. 7 to FIG. 10B, a linear component of the bandgap reference circuit 1100 may be compensated by adjusting a resistance of the resistor R33, and a non-linear component of the bandgap reference circuit 1100 may be compensated by adjusting a resistance of the resistor R36. In some embodiments, the resistor R35 may also be a trimmable resistor, and the non-linear component of the bandgap reference circuit 1100 may be further compensated by adjusting a resistance of the resistor R35. In some embodiments, the resistor R34 may also be a trimmable resistor to have the same resistance as the resistor R35.

In some embodiments, (e.g., when the resistors R33 and R36 are the trimmable resistors) the resistor R33 may include a resistor network R33*a* and a trimming circuit R33*b*, and the resistor R36 may also include a resistor network R36*a* and a trimming circuit R36*b*. In this case, a transmission gate of the trimming circuit R33*b* provided to the resistor network R33*a* may not be positioned on a current path of the resistor R33. Therefore, since a resistance of the resistor R33 hardly changes even if a voltage of a power source VDD is changed, the temperature characteristic of the reference voltage $V_{BGR}$ due to the change of the voltage of the power source VDD may be prevented from being changed.

As discussed above, in the bandgap reference circuit 200 shown in FIG. 2, the temperature characteristic of the reference voltage $V_{BGR}$ may be significantly changed according to the voltage of the power source VDD because of the current path formed in the transmission gate of the trimming circuit R12*a*. For example, as shown in FIG. 12A, when the voltage of the power source VDD is 1.98 V, 1.8 V and 1.62 V, a difference between a maximum value $V_{MAX}$ and a minimum value $V_{MIN}$ of the output voltage $V_{BGR}$ depending on the temperatures may be 1.27 mV, 0.8 mV, and 2.26 mV, respectively. As shown in FIG. 12B, in the bandgap reference circuit 1100, for example, when the voltage of the power source VDD is 1.98 V, 1.8 V, and 1.62 V, the difference between the maximum value $V_{MAX}$ and the minimum value $V_{MIN}$ of the output voltage $V_{BGR}$ depending on the temperatures in the bandgap reference circuit 1100 may be 0.170 mV, 0.125 mV, and 0.260 mV, respectively. That is, in the bandgap reference circuit 1100, the temperature characteristic of the reference voltage $V_{BGR}$ can be stably maintained even when the voltage of the power source VDD is changed.

Figure 13:
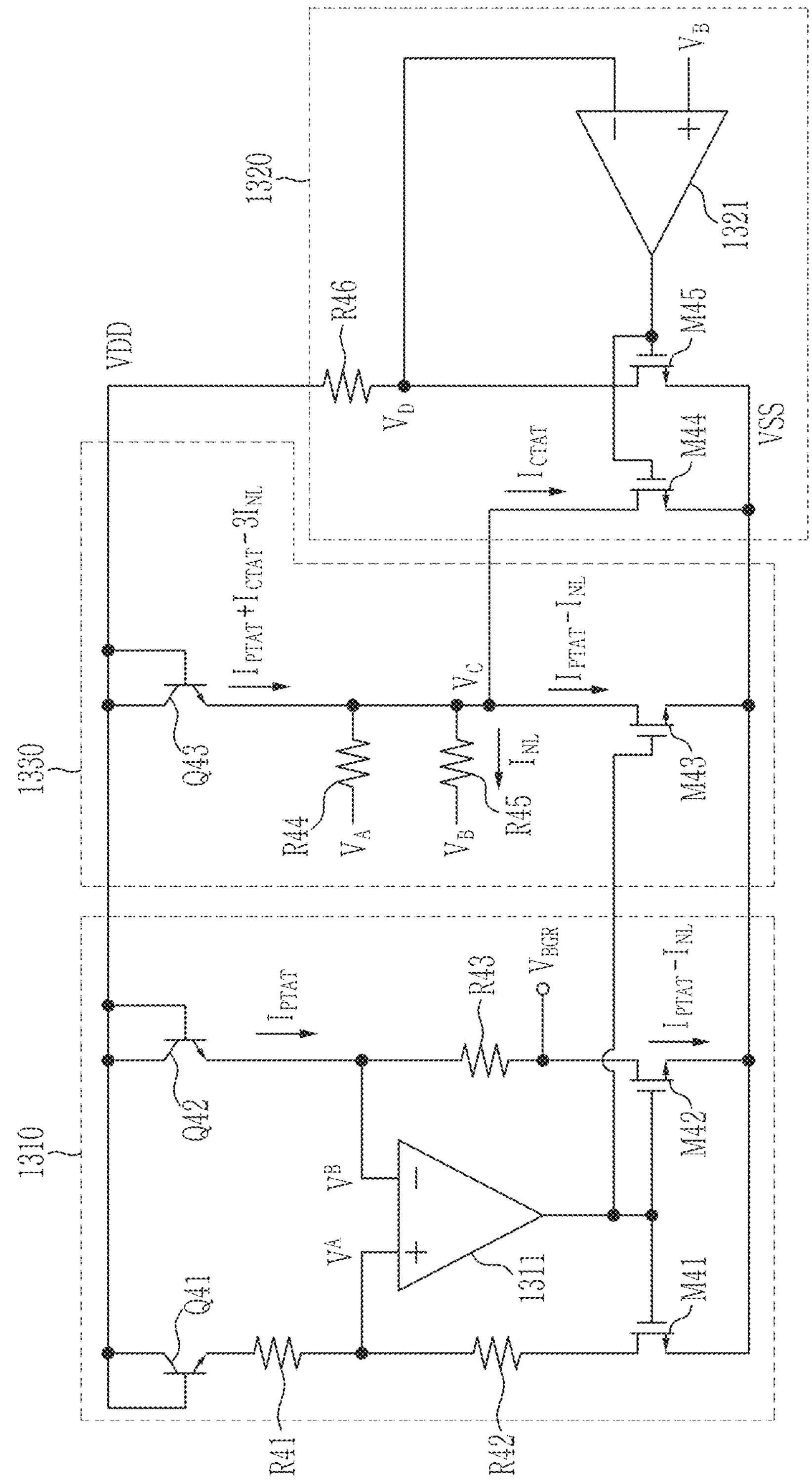
FIG. 13 is an example drawing showing a bandgap reference circuit according to at least one embodiment.

FIG. 13 is an example drawing showing a bandgap reference circuit according to at least one embodiment.

Referring to FIG. 13, a bandgap reference circuit 1300 may include a reference voltage generation circuit 1310, a first non-linear compensation circuit 1320, and a second non-linear compensation circuit 1330. In at least one example embodiment, the reference voltage generation circuit 1310, the first non-linear compensation circuit 1320, and the second non-linear compensation circuit 1330 may be the same (and/or substantially similar) to the reference voltage generation circuit 610, a first non-linear compensation circuit 620, and a second non-linear compensation circuit 630 of FIG. 6. The reference voltage generation circuit 1310 may include transistors Q41 and Q42, transistors M41 and M42, an operational amplifier 1311, and resistors R41, R42, and R43. The first non-linear compensation circuit 1320 may include transistors M44 and M45, an operational amplifier 1321, and a resistor R46, and the second non-linear compensation circuit 1330 may include a transistor Q43, a transistor M43, and resistors R44 and R45. In at least one example embodiment, the transistors Q41, Q42, and Q43 may be NPN BJTs, and the transistors M41, M42, M43, M44, and M45 may be NMOS transistors.

Each of the transistor Q41 and Q42 may be diode-connected (e.g., the base and the collector may be connected to each other in each of the transistors Q41 and Q42). Further, the collectors of the transistors Q41 and Q42 may be connected to a power source VDD. Furthermore, an emitter area of the transistor Q41 may be N times an emitter area of the transistor Q42. The resistor R41 may be connected between the emitter of the transistor Q41 and a node $V_A$, and the emitter of transistor Q42 may be connected to a node $V_B$. The node $V_A$ may be connected to a positive input terminal of the operational amplifier 1311, and the node $V_B$ may be connected to a negative input terminal of the operational amplifier 1311.

The sources of the transistors M41 and M42 may be connected to a power source VSS, and the gates of the transistors M41 and M42 may be connected to each other. Further, the gates of transistors M41 and M42 may be connected to an output terminal of the operational amplifier 1311. The resistor R42 may be connected between the drain of the transistor M41 and the node $V_A$. The drain of the transistor M42 may be connected to an output node at which a reference voltage $V_{BGR}$ is generated, and the resistor R43 may be connected between the output node and the node $V_B$. In some embodiments, the resistors R42 and R43 may have the same resistance. The transistor Q43 may be diode-connected. Further, the collector of transistor Q43 may be connected to the power source VDD. Furthermore, an emitter area of transistor Q43 may have the same size as the emitter area of transistor Q42.

The source of the transistor M43 may be connected to the power source VSS, and the gate of the transistor M43 may be connected to the gates of the transistors M41 and M42. For example, the transistor M43 may form a current mirror that mirrors the currents of the transistors M41 and M42. Further, the gate of transistor M43 may be connected to an output terminal of the operation amplifier 1311. The drain of transistor M43 and the emitter of the transistor Q43 may be connected to a node $V_C$. Further, the resistor R44 may be connected between the node $V_C$ and the node $V_A$, and the resistor R45 may be connected between the node $V_C$ and the node $V_B$. In some embodiments, the resistors R44 and R45 may have the same resistance.

The sources of the transistors M44 and M45 may be connected to the power source VSS, and the gates of transistors M44 and M45 may be connected to each other. The power source VSS may supply a lower voltage than the power source VDD, and may be, for example, a ground terminal. For example, the transistors M44 and M45 may form a current mirror with respect to each other. Further, the gates of transistors M44 and M45 may be connected to an output terminal of the operational amplifier 1321. The drain of the transistor M44 may be connected to the node $V_C$, the drain of the transistor M45 may be connected to the node $V_D$, and the resistor R46 may be connected between the node $V_D$ and the power source VDD. A positive input terminal of the operational amplifier 1321 may be connected to the node $V_B$, and the negative input terminal of the operational amplifier 1321 may be connected to the node $V_D$.

The bandgap reference circuit 1300 may operate as described with reference to FIG. 7 to FIG. 12B, so a description thereof is omitted.

Next, an example of an electronic device in which the above-described bandgap reference circuit or semiconductor device is used is described with reference to FIG. 14.

Figure 14:
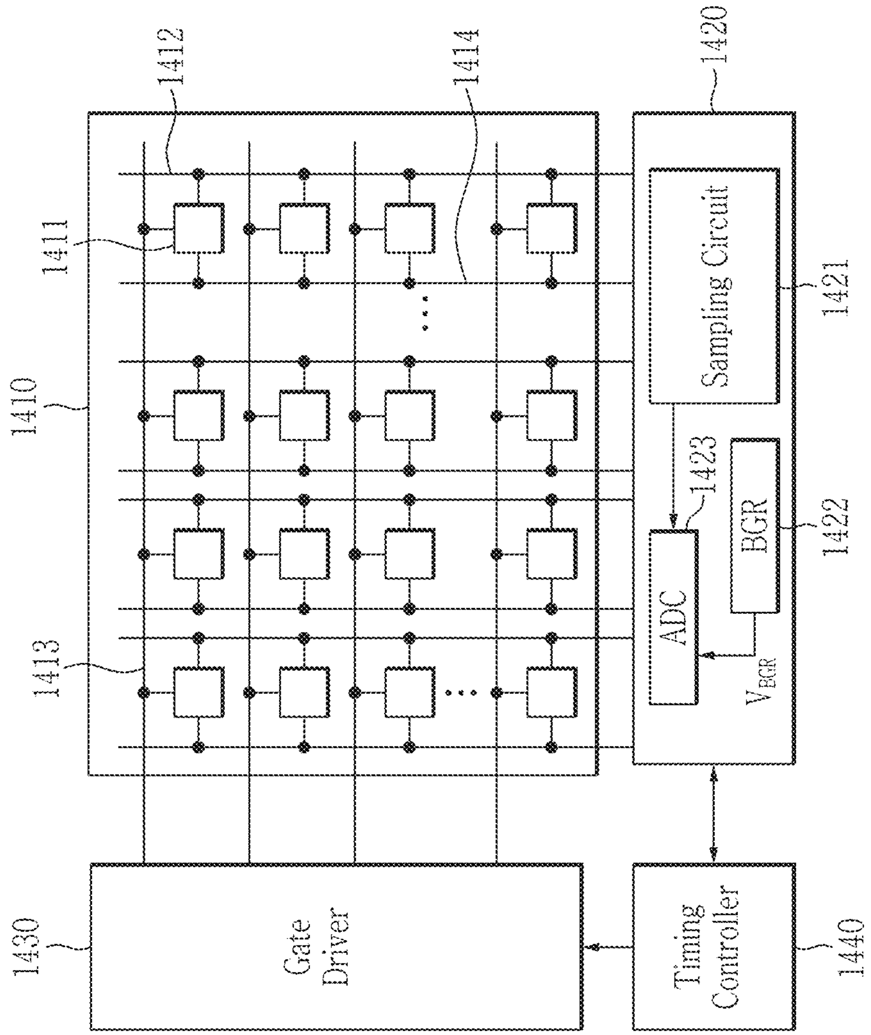
FIG. 14 is an example drawing showing an electronic device according to at least one embodiment.

FIG. 14 is an example drawing showing an electronic device according to at least one embodiment.

Referring to FIG. 14, a display device 1400 may be used as an example of an electronic device 1400. The display device 1400 may include a display panel 1410, a source driver 1420, a gate driver 1430, and a timing controller 1440.

The display panel 1410 may include a plurality of pixels 1411 arranged in a matrix form, and a plurality of data lines 1412, a plurality of gate lines 1413, and a plurality of sensing lines 1414 that are connected to the plurality of pixels 1411. The data lines 1412 and the sensing line 1414 may extend in a row direction, and the gate line 1413 may extend in a column direction. In some embodiments, each pixel 1411 may include an organic light emitting diode (OLED), and the display device 1400 may be an organic light emitting display. In some embodiments, the data line 1412 and the sensing line 1414 may be formed as a single line.

Each pixel 1411 may receive a data signal input through a corresponding data line 1412 in response to a gate pulse input through a corresponding gate line 1413. Further, each pixel 1411 may output a sensing signal through a corresponding sensing line 1414 in response to a gate pulse input through the corresponding gate line 1413. Each pixel 1411 may include, for example, a light source (e.g., an organic light emitting diode (OLED) and/or the like), a driving transistor operating in response to the gate pulse, and a transistor controlling light emission of the light source.

The timing controller 1440 may control operations of the source driver 1420 and the gate driver 1430. The source driver 1420 may transfer data signals to the data lines 1412 in response to a control signal from the timing controller 1440 and receive sensing signals from the sensing lines 1414 in response to a control signal from the timing controller 1440. The gate driver 1430 may sequentially transfer gate pulses to the gate lines 1413 in response to a control signal from the timing controller 1440.

In some embodiments, the source driver 1420 may include a plurality of source integrated circuits (ICs), and each source IC may be connected to a portion of the data lines 1412 and a portion of the sensing lines 1414. Each source IC may include a sampling circuit 1421, a bandgap reference circuit 1422, and an analog-to-digital converting circuit (ADC) 1423. In some embodiments, the sampling circuit 1421 may be provided per sensing line 1414. The ADC 1423 may also be provided per sampling circuit 1421. In some embodiments, the ADC 1423 may be provided for a predetermined number of sampling circuits 1421.

The bandgap reference circuit 1422 may generate a reference voltage $V_{BGR}$ as described with reference to FIG. 6 to FIG. 13. The sampling circuit 1421 may sample the sensing signal received through the sensing line 1414, and the ADC 1423 may convert the sensing signal sampled by the sampling circuit 1421 into digital sensing data based on the reference voltage $V_{BGR}$ generated by the bandgap reference circuit 1422. The source driver 1420 may transfer the sensing data converted by the ADC 1423 to the timing controller 1440.

The timing controller 1440 may calculate a threshold deviation and/or mobility deviation of the driving transistor of the pixel 1411 based on the sensing data and may generate compensation data for compensating for the deviation. The timing controller 1440 may correct video data based on the compensation data and transfer the corrected video data to the source driver 1420. The source driver 1420 may generate the data signal based on the corrected video data.

According to the above-described embodiments, even if the source driver 1420 includes the plurality of source ICs, since the same reference voltage $V_{BGR}$ can be generated in the source $I_{CS}$ regardless of changes in a temperature, the deviation may not occur in sensing data of the source $I_{CS}$. Accordingly, the threshold deviation and/or mobility deviation in the pixels 1411 can be accurately compensated regardless of changes in the temperature.

While present disclosure has been described in connection with what is presently considered to be at least some practical embodiments, it is to be understood that the disclosure is not limited to the disclosed embodiments. On the contrary, it is intended to cover various modifications and equivalent arrangements included within the spirit and scope of the appended claims.

What is claimed is:

1. A bandgap reference circuit comprising:
a reference voltage generating circuit configured to
generate a proportional to absolute temperature (PTAT) voltage and a complementary to absolute temperature (CTAT) voltage, the CTAT voltage having a different temperature characteristic from the PTAT voltage, and
generate a reference voltage at an output node based on the PTAT voltage, the CTAT voltage, and a compensation voltage; and
a compensation circuit configured to
generate a CTAT current based on the CTAT voltage, the CTAT current having a different temperature characteristic from the PTAT voltage, and
determine the compensation voltage based on the CTAT current.

2. The bandgap reference circuit of claim 1, wherein
the reference voltage generating circuit comprises a first resistor and is configured to determine the PTAT voltage based on the first resistor and a PTAT current, and
the compensation circuit comprises a second resistor and is configured to determine the CTAT current based on the second resistor.

3. The bandgap reference circuit of claim 2, wherein the compensation circuit further comprises:
a first non-linear compensation circuit comprising the second resistor, and is configured to determine the CTAT current based on the second resistor and the CTAT voltage; and
a second non-linear compensation circuit configured to determine the compensation voltage based on the PTAT current, the CTAT current, and the CTAT voltage.

4. The bandgap reference circuit of claim 3, wherein
the first non-linear compensation circuit is configured to determine a first portion of the compensation voltage based on the second resistor, and
the second non-linear compensation circuit comprises a third resistor and is configured to determine a second portion of the compensation voltage based on the third resistor.

5. The bandgap reference circuit of claim 4, wherein
the compensation voltage includes a non-linear function with respect to temperature,
wherein the first portion corresponds to a vertex of the non-linear function, and
wherein the second portion corresponds to a curvature of the non-linear function.

6. The bandgap reference circuit of claim 3, wherein the second non-linear compensation circuit is further configured to generate a compensation current based on the PTAT current, the CTAT current, and the CTAT voltage, and the reference voltage generating circuit is configured to determine the compensation voltage based on the first resistor and the compensation current.

7. The bandgap reference circuit of claim 6, wherein the reference voltage generating circuit further comprises a first bipolar transistor and a second bipolar transistor and is configured to determine the PTAT current based on a difference between an emitter-base voltage of the first bipolar transistor and an emitter-base voltage of the second bipolar transistor, and to transfer the PTAT current to the second bipolar transistor to determine the CTAT voltage, and the second non-linear compensation circuit further comprises a third bipolar transistor and is configured to determine the compensation current based on a difference between the emitter-base voltage of the second bipolar transistor and an emitter-base voltage of the third bipolar transistor.

8. The bandgap reference circuit of claim 3, wherein the first non-linear compensation circuit is configured to generate the CTAT current by mirroring a current determined based on the second resistor and the CTAT voltage.

9. The bandgap reference circuit of claim 3, wherein the second non-linear compensation circuit is configured to receive the PTAT current by mirroring a current transferred to the output node.

10. The bandgap reference circuit of claim 2, wherein at least one of the first resistor or the second resistor is a trimmable resistor.

11. A bandgap reference circuit comprising:

a first operational amplifier comprising a first output terminal, a first input terminal connected to a first node, and a second input terminal connected to a second node;

a first diode-connected transistor connected between the first node and a first power source;

a second diode-connected transistor connected between the second node and the first power source;

a third diode-connected transistor connected between a third node and the first power source;

a first resistor connected between the second node and an output node at which a reference voltage is output;

a second operational amplifier comprising a second output terminal, a third input terminal connected to the second node, and a fourth input terminal connected to a fourth node;

a second resistor connected between the fourth node and the first power source;

a third resistor connected between the third node and the second node;

a fourth resistor connected between the first node and the first diode-connected transistor;

a first current mirror connected to a second power source and the first output terminal and configured to transfer a first current to the output node and the third node; and a second current mirror connected to the second power source and the second output terminal and configured to transfer a second current to the third node and the fourth node.

12. The bandgap reference circuit of claim 11, further comprising:

a fifth resistor connected between the first node and a fifth node, wherein the first current mirror is further configured to transfer the first current to the fifth node.

13. The bandgap reference circuit of claim 11, further comprising:

a fifth resistor connected between the third node and the first node.

14. The bandgap reference circuit of claim 11, wherein at least one of the first diode-connected transistor, the second diode-connected transistor, or the third diode-connected transistor is a bipolar transistor.

15. The bandgap reference circuit of claim 14, wherein an emitter area of the first diode-connected transistor has a different size from an emitter area of the second diode-connected transistor.

16. The bandgap reference circuit of claim 15, wherein an emitter area of the third diode-connected transistor has a same size as the emitter area of the second diode-connected transistor.

17. The bandgap reference circuit of claim 11, wherein the first current mirror comprises a fourth transistor connected between the second power source and the output node, the fourth transistor comprising a control terminal connected to the first output terminal; and a fifth transistor connected between the second power source and the third node, the fifth transistor comprising a control terminal connected to the first output terminal, and wherein the second current mirror comprises a sixth transistor connected between the second power source and the third node, the sixth transistor comprising a control terminal connected to the second output terminal; and a seventh transistor connected between the second power source and the fourth node, the seventh transistor comprising a control terminal connected to the second output terminal.

18. The bandgap reference circuit of claim 11, wherein at least one of the first resistor or the second resistor is a trimmable resistor.

19. The bandgap reference circuit of claim 18, wherein the third resistor is a trimmable resistor.

20. An electronic device comprising:

processing circuitry configured to generate a proportional to absolute temperature (PTAT) voltage and a complementary to absolute temperature (CTAT) voltage having a different temperature characteristic from the PTAT voltage, generate a CTAT current based on the CTAT voltage, the CTAT current having a different temperature characteristic from the PTAT voltage, determine a compensation voltage based on the CTAT current, and generate a reference voltage based on the PTAT voltage, the CTAT voltage, and the compensation voltage, and generate a signal based on the reference voltage.

* * * * *